(12) United States Patent
Benedetti et al.

(10) Patent No.: US 9,106,795 B2
(45) Date of Patent: Aug. 11, 2015

(54) COMPUTATIONAL EFFICIENTLY OBTAINING A CONTROL WORD IN A RECEIVER USING TRANSFORMATIONS

(75) Inventors: Ettore Benedetti, Hoofddorp (NL); Arnoud Evert Van Foreest, Hoofddorp (NL)

(73) Assignee: Irdeto B.V., Hoofddorp (NL)

( * ) Notice: Subject to any disclaimer, the term of this patent is extended or adjusted under 35 U.S.C. 154(b) by 597 days.

(21) Appl. No.: 12/980,978

(22) Filed: Dec. 29, 2010

(65) Prior Publication Data

US 2011/0268271 A1 Nov. 3, 2011

(30) Foreign Application Priority Data

Jan. 26, 2010 (EP) ..................................... 10151677
Dec. 21, 2010 (EP) ..................................... 10196221

(51) Int. Cl.
*H04N 7/167* (2011.01)
*H04N 7/16* (2011.01)
*H04N 21/266* (2011.01)
*H04N 21/418* (2011.01)
*H04N 21/4623* (2011.01)
*H04L 9/08* (2006.01)

(52) U.S. Cl.
CPC .............. *H04N 7/163* (2013.01); *H04L 9/0869* (2013.01); *H04N 21/26606* (2013.01); *H04N 21/4181* (2013.01); *H04N 21/4623* (2013.01); *H04L 2209/16* (2013.01)

(58) Field of Classification Search
CPC ... H04N 21/4623; H04N 21/40; H04N 21/41; H04N 21/4181; H04N 21/45; H04N 21/4508; G06F 21/10; G06F 21/50; G06F 21/60

USPC ........ 380/239, 240, 241, 242; 713/27; 726/27
See application file for complete search history.

(56) References Cited

U.S. PATENT DOCUMENTS

| 2004/0086127 | A1 | 5/2004 | Candelore | |
|---|---|---|---|---|
| 2006/0184796 | A1* | 8/2006 | Fahrny | 713/176 |
| 2008/0065548 | A1* | 3/2008 | Muijen | 705/51 |
| 2008/0144822 | A1* | 6/2008 | Wendling et al. | 380/239 |
| 2008/0279386 | A1* | 11/2008 | Kahn et al. | 380/278 |
| 2010/0251285 | A1* | 9/2010 | Eisen et al. | 725/31 |

FOREIGN PATENT DOCUMENTS

| CN | 1643922 A | 7/2005 |
|---|---|---|
| CN | 1736056 A | 2/2006 |
| EP | 1220541 A2 | 7/2002 |
| EP | 2227014 A2 | 9/2010 |

(Continued)

OTHER PUBLICATIONS

Adaptive techniques for leakage power management in L2 cache peripheral circuits, Humayoun et al, IEEE, 2008.*

(Continued)

*Primary Examiner* — Luu Pham
*Assistant Examiner* — Jahangir Kabir
(74) *Attorney, Agent, or Firm* — Marc S. Kaufman; Reed Smith LLP

(57) ABSTRACT

The invention provides a receiver, a smartcard and a conditional access system for securely obtaining a control word using an entitlement transform tree, wherein intermediate results are cached to improve computational efficiency.

14 Claims, 11 Drawing Sheets

(56) References Cited

FOREIGN PATENT DOCUMENTS

| | | |
|---|---|---|
| EP | 2227015 A2 | 9/2010 |
| JP | 2003309545 A | 10/2003 |
| JP | 2004192038 A | 7/2004 |
| JP | 200520218 A | 1/2005 |
| JP | 200553009 A | 3/2005 |
| JP | 2006506029 A | 2/2006 |
| JP | 2007513540 A | 5/2007 |
| JP | 2010213268 A | 9/2010 |
| WO | WO-2006/091304 A2 | 8/2006 |

OTHER PUBLICATIONS

"European Application No. 10151677.1, Communication and Extended European Search Report mailed Aug. 5, 2010", 9 pgs.

Hennessy, J. L., et al., "Computer Architecture. A quantitative approach", "Computer Architecture: A Quantitative Approach," published by Morgan Kaufmann, XP002318184, (Jun. 1, 2002), 390-423.

* cited by examiner

Fig.16A
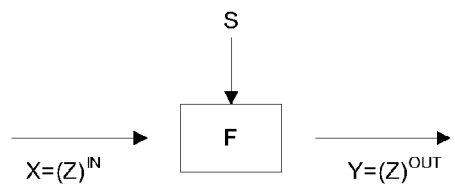
Fig.16B
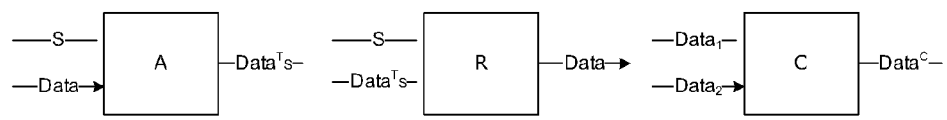
Fig.17A Fig.17B Fig.17C
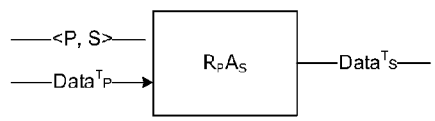 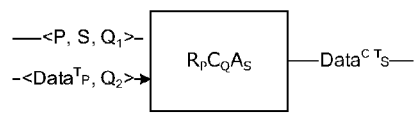
Fig.17D Fig.17E

COMPUTATIONAL EFFICIENTLY OBTAINING A CONTROL WORD IN A RECEIVER USING TRANSFORMATIONS

CLAIM OF PRIORITY

The present patent application claims the benefit of priority under 35 U.S.C. §119 to European Patent Application No. 10151677.1, filed Jan. 26, 2010, and to European Patent Application No. 10196221.5, filed Dec. 21, 2010, the entire contents of which are incorporated herein by reference.

FIELD OF THE INVENTION

The present invention relates to a receiver, a smartcard, a conditional access system and a method for computational efficiently obtaining a control word using transformation functions.

BACKGROUND

Conditional Access systems, such as Pay-TV systems, are known that use software tamper resistance to protect key storage and entitlement processing steps in a digital TV receiver.

Software tamper resistance technology uses basic primitives to obscure software code transformations. Examples of basic primitives are "Apply", "Remove" and "Condition". FIG. 1A, FIG. 1B and FIG. 1C show block diagrams of an apply primitive A, a remove primitive R and a condition primitive C, respectively. The apply primitive typically uses a function $A(D,S)=A_S(D)=D^{TS}$ to transforms a data element D according to a parameter seed S. The remove primitive typically uses a function $R(D^{TS},S)=R_S(D^{TS})=D$ to reverse the transformation of a data element D based on a seed S. The conditional primitive typically uses a function $C(D_1,D_2)=C_{D1}(D_2)=D^{CS}$, wherein the output is a correlation of the two inputs.

The seed S can be constructed from a mixture of multiple data elements. This makes it difficult to extract the individual data elements from the seed. The parameter mixing functions are typically denoted as $f(A,B)=<A,B>$. The function result $<A,B>$ is called the compound of A and B. Hereinafter, seeds and compounds are both referred to as "seeds".

The primitives are typically combined when implementing key management functions in a Conditional Access system. The combination of primitives results in a new function wherein the individual primitives are no longer identifiable. Known examples of combinations of primitives are a combination of remove and apply primitives and a secure correlation of compounds.

FIG. 1D shows an instance of a combination of remove and apply primitives. The transformation uses a compound $<P,S>$ in a combined remove and apply operation. The function $R_PA_S$ modifies the input data by replacing a transformation using the seed P with a transformation using the seed S, i.e. $Data^{TP}$ is transformed into $Data^{TS}$.

FIG. 1E shows an instance of a secure correlation of compounds. It is typically used for conditional entitlement processing and comprises a combination of the basic primitives apply, remove and condition. The conditional function can be combined with remove and apply blocks $R_PA_S$ of FIG. 1D to perform a secure correlation of compounds.

FIG. 2 shows an example of a split key delivery. In FIG. 2 a CW is generated from three subkeys $CW_1$, $CW_2$ and $CW_3$. The subkeys $CW_1$, $CW_2$ and $CW_3$ are distributed under protection of seeds P, G and U, respectively. Hereto $CW_1$ is distributed in a mathematically transformed form in transformation space P, $CW_2$ is distributed in a mathematically transformed form in transformation space G and $CW_3$ is distributed in a mathematically transformed form in transformation space U.

FIG. 3 shows an example of CW processing in a receiver. In FIG. 3 the CW is generated from subkeys and a membership check is performed. The processing is divided in two basic parts: a secure computation environment and a generic processing environment. Functional modules in the generic processing environment and the secure computation environment form an entitlement transform tree for transforming an input transformed CW, e.g. $CWD^{TP}$, into a CW encrypted using a receiver specific key, e.g. $\{CW\}_{CSSK}$. The generic processing environment deals with the external interfaces such as storage, data communication and user interaction. The secured computation environment deals with the processing of keys and/or seeds.

An ECM Delivery Path is used for the reception of entitlement control messages (ECM) from a head-end system. The ECM comprises an encrypted or transformed CW. An EMM Delivery Path is used for the reception of entitlement management messages (EMM) from the head-end system. The EMM comprises keys or seeds for decrypting or transforming the encrypted or transformed CW.

The software tamper resistance primitives in the secure computation environment have inputs and outputs that are not useful to an attacker if intercepted. The remove operation on the transformed control word $CWD^{TP}$ requires value P, which is received in a compound $<P,G_1>$, thus tied with $G_1$. $G_1$ is distributed in a compound $<G_1,U_1>$, thus tied with $U_1$. After the two Remove/Apply operations $R_PA_{G1}$ and $R_{G1}A_{U1}$, the obtained transformed control word $CWD^{TU1}$ is input to a TDES Encryption Whitebox module for the generation of an encrypted CW that can be processed by the receiver. The resulting CW is encrypted using a receiver specific key such as a chip set session key CSSK. The CSSK is typically provided in one of the entitlement messages. The CSSK, U1 and U2 values are typically provided to the TDES Encryption Whitebox as a compound $<CSSK,U_1,U_2>$.

The conditional entitlement processing of FIG. 3 uses a secure correlation function $R_{G2}C_{vector}A_{U2}$ to implement a group membership check. A result of the correlation computation is a Control Word Difference Key CWDK in transformation space $U_2$, i.e. $CWDK^{CTU2}$. $CWDK^{CTU2}$ and $CWD^{TU1}$ are subkeys used in the calculation of the CW in the TDES Encryption Whitebox.

Subkeys, such as $CW_1$, $CW_2$ and $CW_3$ of FIG. 2 and $CWDK^{CTU2}$ and $CWD^{TU1}$ of FIG. 3, may have different life spans. As an example $CW_1$ may change on a regular basis such as every 10 seconds, $CW_2$ may change on a sporadic basis measured in days and $CW_3$ may change very seldom measured in months.

Known software tamper resistant conditional entitlement processing technologies for the obtainment of CWs from transformed subkeys do not take into account the different life spans of subkeys. As a consequence all intermediate operations in the conditional entitlement processing are always performed in order to obtain the CW. The execution of each intermediate operation is expensive in terms of processor cycles.

There is a need to reduce the number of computations in software tamper resistant conditional entitlement processing technologies, especially in devices wherein processing capabilities are limited, while not adversely affecting the tamper resistance of the implementation.

SUMMARY OF THE INVENTION

It is an object of the invention to provide an improved software tamper resistant conditional entitlement processing technology for the obtainment of CWs, wherein computational efficiency is increased.

According to an aspect of the invention a receiver is proposed for securely obtaining a control word. The receiver comprises a first memory configured for storing a transform function. The transform function is configured to receive a transformed control word and a seed and to migrate the transformed control word from an input transform space to an output transform space. Hereby the transform function obtains the control word using a mathematical transformation under control of the seed. The receiver further comprises a cache memory and a cache control module. The cache control module is configured to intercept the transformed control word and the seed. The cache control module is further configured to search in the cache memory for the control word matching the transform function, the transformed control word (x) and the seed (y). The cache control module is further configured to, if the control word is found in the cache memory, provide the control word to an output of the transform function thereby bypassing the transform function. The cache control module is further configured to, if the control word is not found in the cache memory, provide the control word and the seed to the transform function, obtain the control word from the transform function and store the control word associatively with the transform function, the transformed control word (x) and the seed (y) in the cache memory.

According to an aspect of the invention a method is proposed for securely obtaining a control word in a receiver. The receiver comprises a first memory configured for storing a transform function. The method comprises the step of receiving a transformed control word and a seed. The method further comprises the step of intercepting in a cache control module the transformed control word and the seed. The method further comprises the step of searching in a cache memory for the control word matching the transform function, the transformed control word and the seed. The method further comprises the step of, if the control word is found in the cache memory, providing the control word to an output of the transform function thereby bypassing the transform function. The method further comprises the steps of, if the control word is not found in the cache memory, providing the control word and the seed to the transform function, migrating in the transform function the transformed control word from an input transform space to an output transform space to obtain the control word using a mathematical transformation under control of the seed, and storing the control word associatively with the transform function, the transformed control word and the seed in the cache memory.

Thus, the control word in the output transform space is not computed by the transform function if the expected result is, based on the input to the transform function, available in the cache memory. Hereby the computational efficiency in obtaining the control word is increased.

The output transform space may be a cleartext transform space, resulting in the control word being in cleartext. The resulting cleartext control word may be encrypted after being obtained. The output transform space may be any other transform space, requiring a further transformation of the control word to obtain the control word in the cleartext transform space.

The embodiments of claims 2 and 10 advantageously enable subsequent transformations in a sequence of transform functions and/or combining of transformed subkeys in a tree of transform functions, wherein intermediate results are cached for computational efficiency.

The embodiment of claim 3 advantageously enables the end result of the computations, i.e. the clear text control word or the encrypted control word, to be used in the receiver for descrambling content.

The embodiment of claim 4 advantageously enables obfuscation of computer code and functional behaviour of the transform functions, making it more difficult to obtain information about the control word during the mathematical transformations. Advantageously, the cached intermediate results can be stored in conventional non-obfuscated memory, making the cache memory easier and cheaper to implement.

The embodiment of claim 5 advantageously enables caching functionality with only a single cache control module in the generic computation environment.

The embodiment of claim 6 advantageously enables the cache control functionality to be implemented in the secure computation environment, leaving only the cache memory part of the caching in the generic computation environment. This results in less modifications of the generic computation environment for implementing the caching functionality.

The embodiment of claim 7 advantageously enables the caching functionality in conditional access systems using smartcards for the obtainment of control words.

The embodiment of claim 8 advantageously enables sharing of the smartcard in a network, wherein intermediate results can be cached in each receiver.

According to an aspect of the invention a smartcard is proposed for use in a receiver having one or more of the above described features. The smartcard comprises a first memory in a secure computation environment. The first memory is configured for storing a transform function. The transform function is configured to receive a transformed control word and a seed and to migrate the transformed control word from an input transform space to an output transform space. Hereby the transform function obtains a control word using a mathematical transformation under control of the seed. The transform function comprises a cache control module. The cache control module is configured to intercept the transformed control word and the seed. The cache control module is further configured to search in a cache memory of the receiver for the control word matching the transform function, the transformed control word (x) and the seed. The cache control module is further configured to, if the control word is found in the cache memory, provide the control word to an output of the transform function thereby bypassing the transform function. The cache control module is further configured to, if the control word is not found in the cache memory, provide the control word and the seed to the transform function, obtain the control word from the transform function and store the control word associatively with the transform function, the transformed control word and the seed in the cache memory.

Thus, caching functionality is enabled in conditional access systems using smartcards for the obtainment of control words. The control word in the output transform space is not computed by the transform function if the expected result is, based on the input to the transform function, available in the cache memory. Hereby the computational efficiency in obtaining the control word in the smartcard is increased.

The smartcard is typically implemented having a traditional form factor. Any other computing device implementing smartcard technology may be used as a smartcard instead, such as e.g. a PC running smartcard emulation software.

According to an aspect of the invention a conditional access system is proposed. The conditional access system comprises a head-end system and one or more receivers having one or more of the above described features. The head-end system is configured to transmit an entitlement control message and an entitlement management message to the receiver. The entitlement control message comprises the transformed control word. The entitlement management message comprises one or more seeds.

Thus, caching functionality is enabled in conditional access systems, wherein a transformed control word is provided by a head-end system to a receiver for transforming the transformed control word from an input transform space to an output transform space. The control word in the output transform space is not computed by the transform function if the expected result is, based on the input to the transform function, available in the cache memory. Hereby the computational efficiency in obtaining the control word is increased.

Hereinafter, embodiments of the invention will be described in further detail. It should be appreciated, however, that these embodiments may not be construed as limiting the scope of protection for the present invention.

BRIEF DESCRIPTION OF THE DRAWINGS

Aspects of the invention will be explained in greater detail by reference to exemplary embodiments shown in the drawings, in which:

FIG. 16A shows a block diagram of a function performing a mathematical transformation;

FIG. 16B shows a block diagram of a function performing a mathematical transformation under control of a seed;

FIG. 17A shows a block diagram of an apply primitive;

FIG. 17B shows a block diagram of a remove primitive;

FIG. 17C shows a block diagram of a condition primitive;

FIG. 17D shows a block diagram of a combination of a remove and an apply primitive;

FIG. 17E shows a block diagram of a secure correlation of compounds; and

DETAILED DESCRIPTION OF THE DRAWINGS

Caching is a known optimization technology in computer science that allows previously used data, in whatever form, to be stored and reused instead of being recomputed. As caches cannot be infinite in size, cached data is typically kept or discarded based on a usage pattern algorithm, such as e.g. a least recently used (LRU) algorithm, a most recently used (MRU) algorithm or a least-frequently used (LFU) algorithm.

Figures 1A, 1B, 1C:
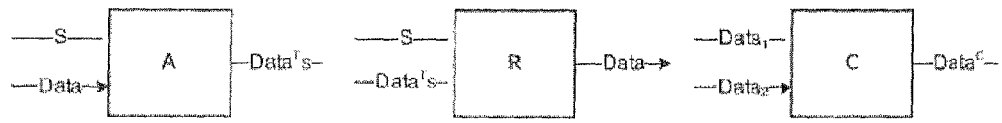
FIG. 1A shows a prior art block diagram of an apply primitive as used in software tamper resistance technology.
FIG. 1B shows a prior art block diagram of a remove primitive as used in software tamper resistance technology.
FIG. 1C shows a prior art block diagram of a condition primitive as used in software tamper resistance technology.
Figures 1D, 1E:
FIG. 1D shows a prior art block diagram of a combination of remove and apply primitives as used in software tamper resistance technology.
FIG. 1E shows a prior art block diagram of a secure correlation of compounds as used in software tamper resistance technology.
Figure 2:
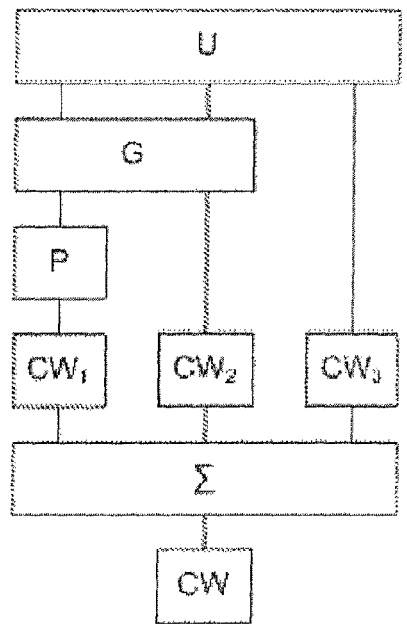
FIG. 2 shows a simplified split key delivery process.
Figure 3:
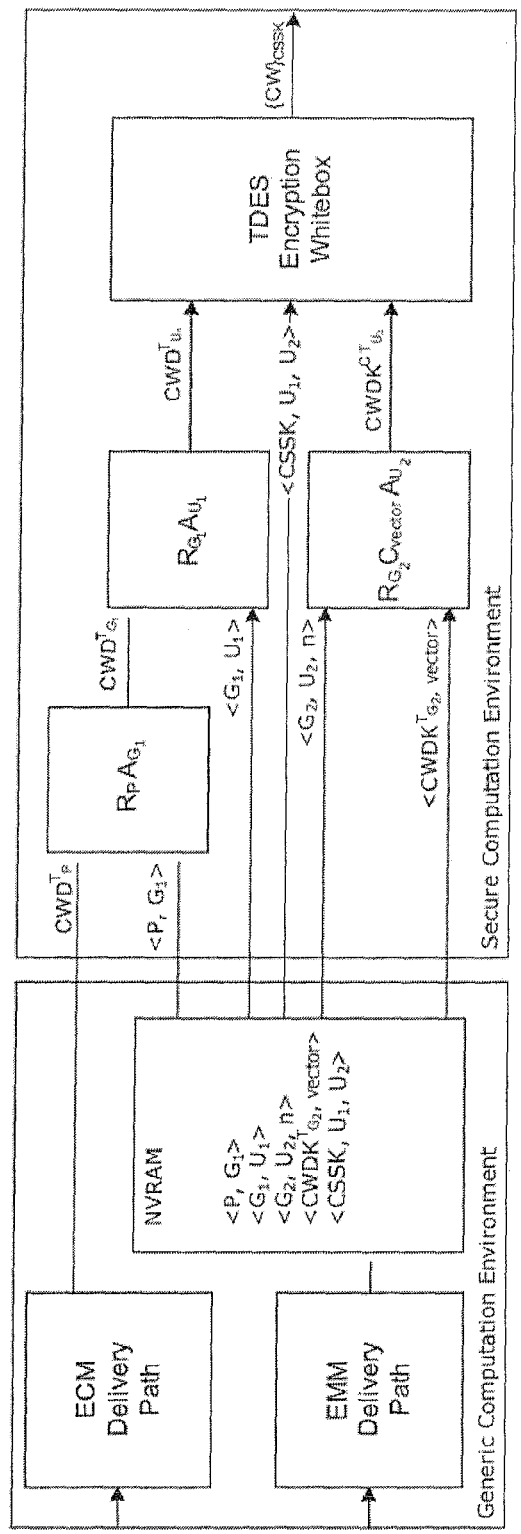
FIG. 3 shows a split key delivery process in a receiver.

A prior art example of an implementation of an entitlement transform tree is shown in FIG. 3. The invention enables caching of intermediate results in the entitlement transform tree, thereby increasing the computational efficiency. Caching functionality is created such that it can be implemented in the generic computation environment without affecting the tamper resistance of the conditional entitlement processing.

An intermediate value in the entitlement transform tree, e.g. $CWDK^{CTu2}$ shown in FIG. 3, can be considered as non-sensitive data as it is only useful in the context of the sequence of functions and seeds in the entitlement transform tree. As a result, intermediate values can be stored in the generic computation environment for the purpose of caching, without degrading security.

Typically, intermediate data values that remain constant between two consecutive generations of frequently changing subkey are cached. It will be understood that caching is not limited to intermediate values for frequently changing subkeys and that intermediate values for less frequently changing subkeys can be cached as well. In case all intermediate values are unchanged between two consecutive generations of the CW itself, it is possible to have the resulting CW cached. In the latter case, typically the CW is cached in encrypted form, such as $\{CW\}_{CSSK}$.

Caching functionality is implemented by storing one or more of the intermediate values and/or end-result value together with an associated caching reference. Typically, the caching reference comprises input values, such as a transformed CW, a seed and/or a compound, and an indication of or reference to the function to which the input values are input for the calculation of the intermediate or end-result value.

The computation of the CW in the entitlement transform tree consists of a sequence of transform functions. A known example without caching is shown in FIG. 3. Transform functions, such as shown in FIGS. 1A-1E, are not stateful and typically conditional in that a semantically correct output value can be produced only when the inputs are correct.

Figure 4:
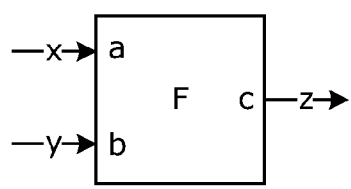
FIG. 4 shows a transform function of an exemplary embodiment of the invention.

Schematically each transform function can be represented as shown in FIG. 4. FIG. 4 shows transform function F that has two inputs a and b and that generates one output c. Inputs a and/or b and output c are protected by a mathematical transformation, enabling the data values x,y and z to be processed and stored in an untrusted domain such as a generic computation environment of a receiver.

Figure 5:
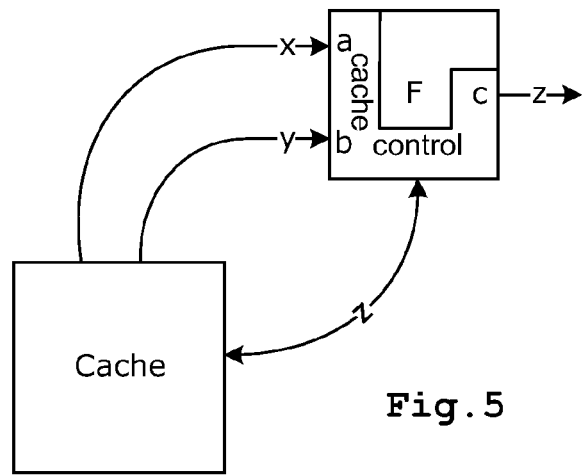
FIG. 5 shows a transform function with caching of an exemplary embodiment of the invention.

FIG. 5 shows a transformation function F with added caching functionality of an exemplary embodiment of the invention. In the embodiment of FIG. 5 a cache control is added to the transformation function F. The cache transmits the input data values x and y to the inputs a and b, respectively, of the transform function F. The function F generates an output comprising the value z. Since the function is not stateful, the same set of input values x and y are always processed by transformation function F into the same output value z. The output z is stored in the cache to optimize later calculations of the same operation. The module implementing the transformation function has a cache control function that activates function F only when the resulting output value z for a given combination of inputs x and y is not available in the cache. If the output value z for the given combination x and y is cached, then the cache provides the output value z to the output c directly.

Figure 6:
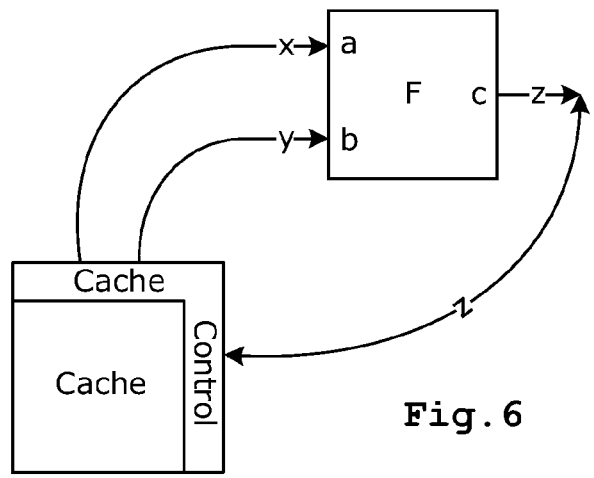
FIG. 6 shows a transform function with caching of an exemplary embodiment of the invention.

FIG. 6 shows a transformation function F with added caching functionality of an exemplary embodiment of the invention. In the embodiment of FIG. 6 a cache control is added to the cache. The cache control transmits the input data values x and y to the inputs a and b, respectively, of the transform function F. The function F generates an output comprising the value z. Since the function is not stateful, the same set of input values x and y are always processed by transformation function F into the same output value z. The output z is stored in the cache to optimize later calculations of the same operation. The cache has a cache control function that activates function F only when the resulting output value z for a given combination of inputs x and y is not available in the cache. If the output value z for the given combination x and y is cached, then the cache provides the output value z to the output c directly.

In the examples of FIG. 5 and FIG. 6 the cache links function output values z with a set of function input parameter values x,y. Hereto a simple URL-style string may be used as a caching reference. Alternatively any other known data structure may be used to implement a caching reference. An example of a caching reference string is "Fc?Fa=x&Fb=y", describing the calculation of the result 'Fc' from transform function 'F' using the value 'x' for input 'Fa' and the value 'y' for the input 'Fb'. The caching reference "Fc?Fa=x&Fb=y" is stored in the cache along with the associated the function result 'z'.

As an example, the following table shows the cache entries as stored in the cache memory after the calculation of "F(x, y)=z" and "F(u,v)=w".

| Caching reference | Value |
|---|---|
| "Fc?Fa=x&Fb=y" | z |
| "Fc?Fa=u&Fb=v" | w |

A next time the function F is activated, the cache first determines if the result for the calculation has been performed before. If there is a cache hit, the calculation is not carried out and the cached result is used instead.

Figure 7:
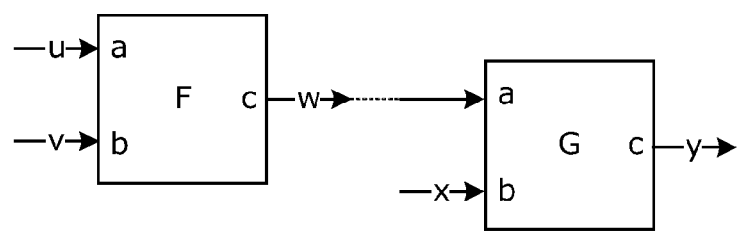
FIG. 7 shows a sequence of two transform functions of an exemplary embodiment of the invention.

FIG. 7 shows an exemplary embodiment of the invention wherein a sequence of two transform functions produce an output y. Each of the transform functions F and G operates similar to the function F described in FIG. 4 and is provided with caching functionality as described in FIG. 5 or FIG. 6.

In order to generate the output "Gc", the transform function G is activated with the value 'x' for its input parameter "Gb".

The input parameter "Ga" is connected to the output of transform function "F(u,v)". The cache uses the result parameter string "Fc?Fa=u&Fb=v" to search for an earlier calculation of this function call. If the cache finds a result for this caching reference, the function 'F' does not need to be activated and the cached value w is used instead. The cache is then used to determine if the result of the calculation of "G(w,x)" is held in the cache. The cache now uses the caching reference "Gc?Ga=w&Gb=x" to search for the result. If found, the function 'G' does not need to be activated and the cached result 'y' is sent to the output of transform function 'G'. If the cache does not find a match, it activates the calculation of "G(w,x)". After the calculation, the result 'y' is returned to the cache and to the output "Gc". After these operations, the following cache entries are stored in the cache memory.

| Parameter name | Value |
|---|---|
| "Fc?Fa=x&Fb=y" | z |
| "Fc?Fa=u&Fb=v" | w |
| "Gc?Ga=w&Gb=x" | y |

The caching operation may be optimized by taking into account the structure of the transform tree and cache the combined result of a series of transform functions as a single string. This reduces access to the cache memory. E.g. in the example of FIG. 7 using this optimization a single cache hit could produce the output value y instead of two cache hits. Hereto the cache content of the example of FIG. 7 is extended with the following entry in the cache table.

| Parameter name | Value |
|---|---|
| "FGc?Fa=x&Fb=y&Gb=x" | z |

As shown in FIG. 5 and FIG. 6, the cache control is implemented as a wrapper around a transform function or around a cache memory. In both implementations the cache control is configured to conditionally activate a transform function module and provide the transform function with the relevant inputs.

Figure 8:
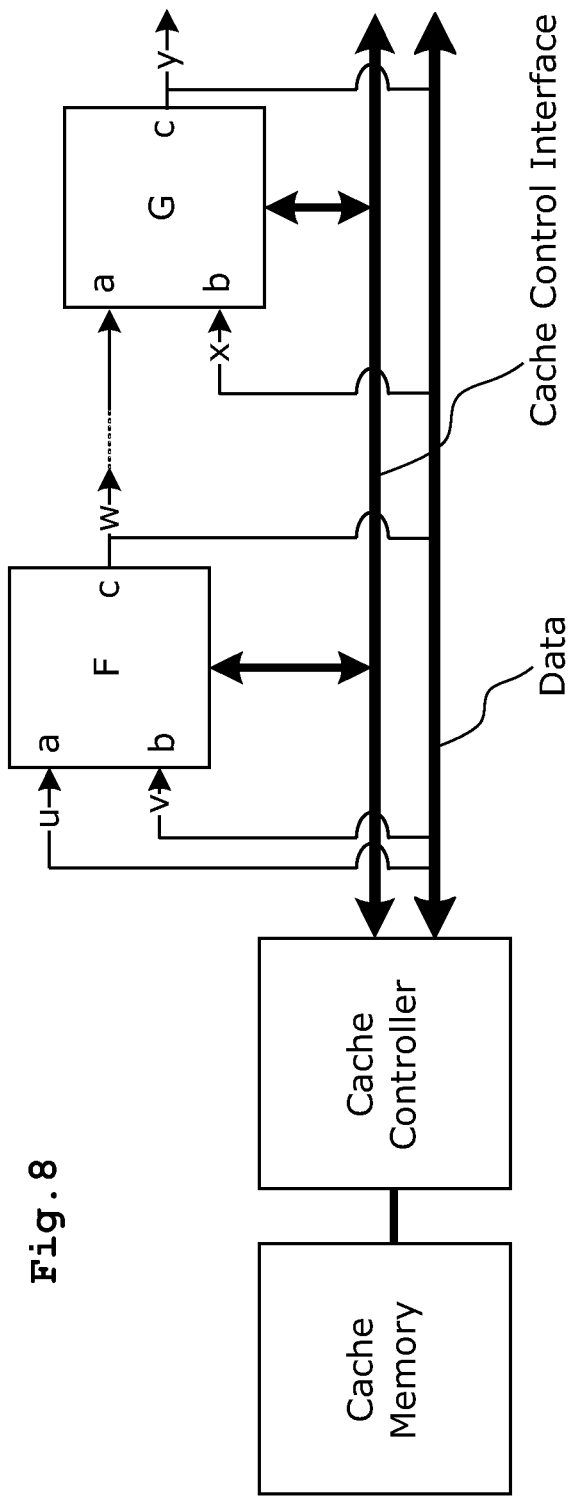
FIG. 8 shows a sequence of two transform functions with caching of an exemplary embodiment of the invention.

FIG. 8 shows an example of two transform functions F and G that are connected to a cache controller using a bus structure. The cache controller is connected to all transform function modules via the bus. This enables data u, v, w, x and y to be provided to the inputs Fa, Fb, Ga, Gb and outputs Fc, Gc, respectively, of the transform functions F and G. The cache control interface is used to activate the transform function modules in case an output value is not stored in the cache memory.

The cache controller of FIG. 8 operates similar to the cache control showed in FIG. 6. It will be understood that a bus structure as shown in FIG. 8 can also be used with cache control functionality in each transform function F and G, similar to the operation of the cache control shown in FIG. 5.

In addition to searching for cache entries and conditionally activating transform functions, the cache controller is optionally configured to remove unused cache entries to manage the memory size of the cache. Hereto the cache controller may use any known cache management technique to ensure that only the most relevant information is kept in the cache.

Figure 9:
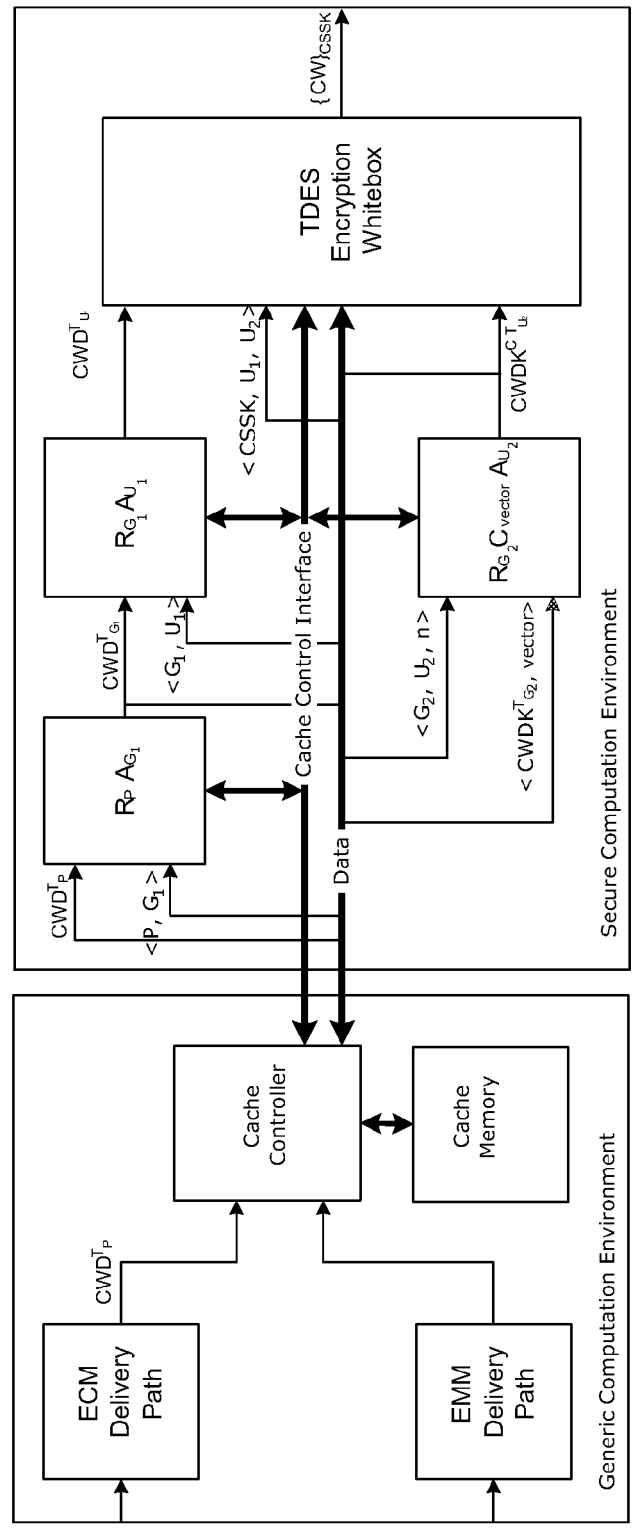
FIG. 9 shows a split key delivery process with caching in a receiver of an exemplary embodiment of the invention.

FIG. 9 shows an example of an entitlement transform tree implementation extended with caching optimization. The transform functions in the entitlement transform tree of FIG. 9 are similar to the transform functions of the entitlement transform tree shown in FIG. 3 and the same transform function sequence is used. In the example of FIG. 9 all data in the transform tree passes through the cache controller and a data interface indicated by "Data". The cache controller also controls the activation of the transform function modules via a cache control interface.

FIG. 9 shows two parts of a receiver: a secure computation environment and a generic processing environment. The generic processing environment deals with external interfaces such as storage, data communication and user interaction. The secured computation environment deals with processing of keys and/or seeds. The processing is typically performed by one or more processors (not shown).

The ECM delivery path is used for the reception of entitlement control messages (ECM) from a head-end system. The ECM comprises an encrypted or transformed CW. The EMM delivery path is used for the reception of entitlement management messages (EMM) from the head-end system. The EMM comprises keys or seeds for decrypting or transforming the encrypted or transformed CW. The ECM delivery path and the EMM delivery path are typically implemented in an input module for receiving the ECMs and EMMs.

In the example of FIG. 9 the generic computation environment contains the caching functionality, which is implemented as a cache controller and a cache memory. Via the cache controller data flows from the ECM delivery path and EMM delivery path to the cache memory and between the cache memory and the transform functions ($R_P A_{G1}$, $R_{G1} A_{U1}$ and $R_{G2} C_{vector} A_{U2}$) and TDES encryption whitebox.

In this example the following aliases are used for the transform functions: $F=R_P A_{G1}$, $G=R_{G1} A_{U1}$ and $H=R_{G2} C_{vector} A_{U2}$. F has to inputs Fa and Fb and an output Fc, G has two inputs Ga and Gb and an output Gc and H has two inputs Ha and Hb and an output Hc. All inputs and outputs of F, G and H are connected to the cache controller via the data bus.

Via the ECM delivery path a transformed control word in transformation space P, i.e. $CWD^{TP}$, is received. Via the EMM delivery path seeds $<P,G_1>$, $<G_1,U_1>$, $<G_2,U_2,n>$ and $<CSSK,U_1,U_2>$ are received. Via the EMM delivery path also a compound of a Control Word Difference Key CWDK in transformation space $G_2$ and a vector, i.e. $<CWDK^{TG2},vector>$, is received for a group membership check.

The cache controller searches the cache memory for a cached output value of transform function F matching the input values being $CWD^{TP}$ for Fa and $<P,G_1>$ for Fb. If the cached output value is found, the cached value is provided to Fc without invoking function F. If no output value is found, $CWD^{TP}$ is provided to Fa and $<P,G_1>$ is provided to Fb via the data bus. Via the cache control interface an instruction is given from the cache controller to the transform function F to generate the output value using the input data on Fa and Fb and to return the result via Fc and the data bus to the cache controller. The result is stored in the cache memory, which now contains the following entry.

| Parameter name | Value |
|---|---|
| "Fc?Fa=$CWD^{TP}$&Fb=$<P,G_1>$" | $CWD^{TG1}$ |

Next, the cache controller searches the cache memory for a cached output value of transform function G matching the input values being the output value of F for Ga and $<G_1,U_1>$ for Gb. If the cached output value is found, the cached value is provided to Gc without invoking function G. If no output value is found, the output value of F, in this example $CWD^{TG1}$, is provided to Ga and $<G_1,U_1>$ is provided to Gb via the data bus. Via the cache control interface an instruction is given from the cache controller to the transform function G to generate the output value using the input data on Ga and Gb and to return the result via Gc and the data bus to the cache controller. The result is stored in the cache memory, which now contains the following entries.

| Parameter name | Value |
|---|---|
| "Fc?Fa=$CWD^{TP}$&Fb=$<P,G_1>$" | $CWD^{TG1}$ |
| "Gc?Ga=$CWD^{TG1}$&Gb=$<G_1,U_1>$" | $CWD^{TU1}$ |

Alternatively or optionally the result after processing the inputs by transform functions F and G is stored in the cache memory as a single entry, allowing the result of transform function G to be found in the cache memory in a single step using the input values Fa=$CWD^{TP}$, Fb=$<P,G_1>$ and Gb=$<G_1,U_1>$. The cache memory then contains e.g. the following entries.

| Parameter name | Value |
|---|---|
| "Fc?Fa=$CWD^{TP}$&Fb=$<P,G_1>$" | $CWD^{TG1}$ |
| "Gc?Ga=$CWD^{TG1}$&Gb=$<G_1,U_1>$" | $CWD^{TU1}$ |
| "FGc?Fa=$CWD^{TP}$&Fb=$<P,G_1>$&Gb=$<G_1,U_1>$" | $CWD^{TU1}$ |

For the group membership check the cache controller searches the cache memory for a cached output value of secure correlation function H matching the input values being $<G_2,U_2,n>$ for Ha and $<CWDK^{TG2},vector>$ for Hb. If the cached output value is found, the cached value is provided to Hc without invoking function H. If no output value is found, $<G_2,U_2,n>$ is provided to Ha and $<CWDK^{TG2},vector>$ is provided to Hb via the data bus. Via the cache control interface an instruction is given from the cache controller to the secure correlation function H to generate the output value using the input data on Ha and Hb and to return the result via Hc and the data bus to the cache controller. The result is stored in the cache memory, which now contains the following entries.

| Parameter name | Value |
|---|---|
| "Fc?Fa=$CWD^{TP}$&Fb=$<P,G_1>$" | $CWD^{TG1}$ |
| "Gc?Ga=$CWD^{TG1}$&Gb=$<G_1,U_1>$" | $CWD^{TU1}$ |
| "FGc?Fa=$CWD^{TP}$&Fb=$<P,G_1>$&Gb=$<G_1,U_1>$" | $CWD^{TU1}$ |
| "Hc?Ha=$<G_2,U_2,n>$&Hb=$<CWDK^{TG2},vector>$" | $CWDK^{CTU2}$ |

In a last step the output data of Gc and Hc, i.e. $CWD^{TU1}$ and $CWDK^{CTU2}$, respectively, are provided together with seed $<CSSK,U_1,U_2>$ to the TDES Encryption Whitebox via the data bus for the generation of $\{CW\}_{CSSK}$. The resulting $\{CW\}_{CSSK}$ is typically not cached in the cache memory to prevent this data from being obtained in the generic computation environment.

The implementation of the transform tree in the secure computation environment is not limited to the example of FIG. 9. There are typically two or more transform functions in a sequence of transform functions. The transform functions can form an entitlement transform tree with one or more branches. Each transform function can be any known transform function. Instead of the TDES encryption whitebox any other encryption function may be used for the generation of an encrypted control word from a transformed control word.

Alternatively, instead of the TDES encryption whitebox a remove primitive may be used to generate a clear text control word from a transformed control word.

Caching may not be efficient for all steps in the transform sequence. For example, when a cache hit ratio is expected to be low for a particular transform function, caching functionality can actually reduce overall processing performance due to cache memory access prior to performing the transform function. To avoid such reduction of overall processing performance, one or more transform function modules can be implemented without caching functionality, resulting in its input values being processed by the transform function module for the generation of the output value without searching for a cache hit.

In the example of FIG. 9 the generic computation environment and the secure computation environment are parts of a receiver. Alternatively, the secure computation environment is implemented in a smartcard and the generic computation environment is implemented in a receiver.

Instead of a smartcard having a traditional form factor, any other computing device implementing smartcard technology may be used as a smartcard, such as e.g. a PC running smartcard emulation software.

Figure 10:
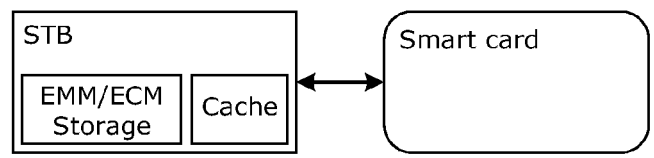
FIG. 10 shows a receiver and a smartcard of an exemplary embodiment of the invention.

FIG. 10 shows a simplified architecture containing a set-top box (STB) as a digital TV receiver and a smartcard that is communicatively connected to the STB, e.g. through insertion of the smartcard in the STB. EMMs and ECMs received by the STB can be stored in an EMM/ECM storage before processing by the smartcard. The smartcard obtains data from the ECMs and EMMs in any manner known per se, which data includes the input data for an entitlement transform tree in the secure computation environment of the smartcard. Inputs to and outputs from transform functions and/or secure correlation functions are stored in the cache in the STB.

Figure 11:
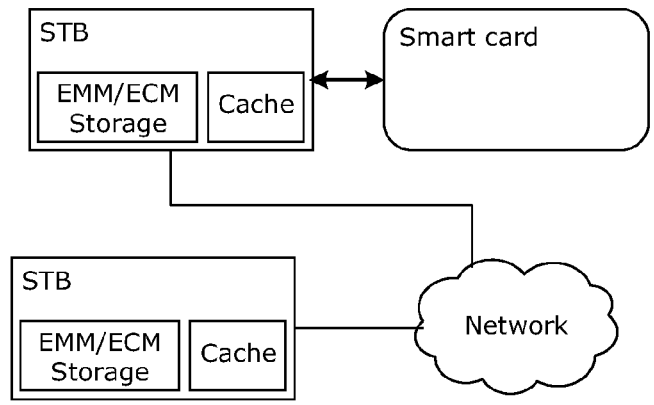
FIG. 11 shows two receivers sharing a smartcard of an exemplary embodiment of the invention.

It is possible to have two or more networked devices share a common smartcard. In the example of FIG. 11 two STBs each store ECMs and EMMs received from a headend system in encrypted form in a non-volatile memory indicated by EMM/ECM storage. STBs without an inserted smartcard establish a secure connection to the smartcard via a network and through the intermediary of the STB wherein the smartcard is inserted. The smartcard receives one or more ECMs and related EMMs from the receiver and decrypts the ECMs and EMMs to obtain the input data for the transform function modules in the secure computation environment of the smartcard. Output values of the transform functions are transmitted via the secure connection to the STB for storage in a local cache of the STB.

Figure 12:
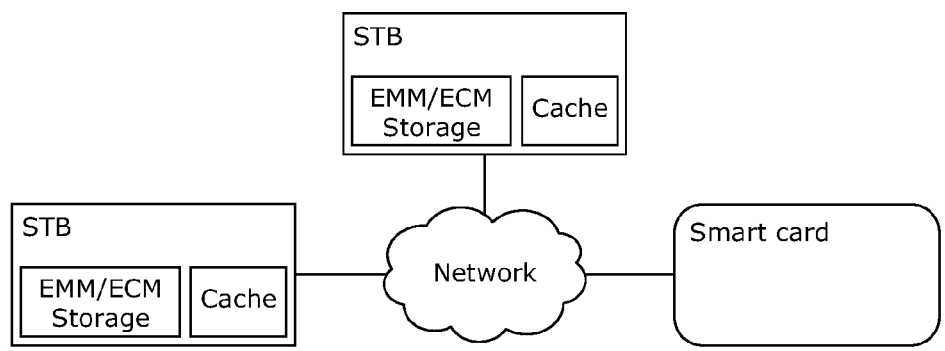
FIG. 12 shows two receivers sharing a smartcard via a network of an exemplary embodiment of the invention.

An alternative to the example of FIG. 11 is shown in FIG. 12, wherein the smartcard is communicatively connected to the network instead of inserted in one of the STBs, and wherein each STB accesses the smartcard via the network.

A STB typically has more storage space than a smartcard. Therefore, in the examples of FIGS. 10-12 the cache memory is implemented in the STB. Alternatively it is possible to implement the cache memory in the smartcard.

Figure 13:
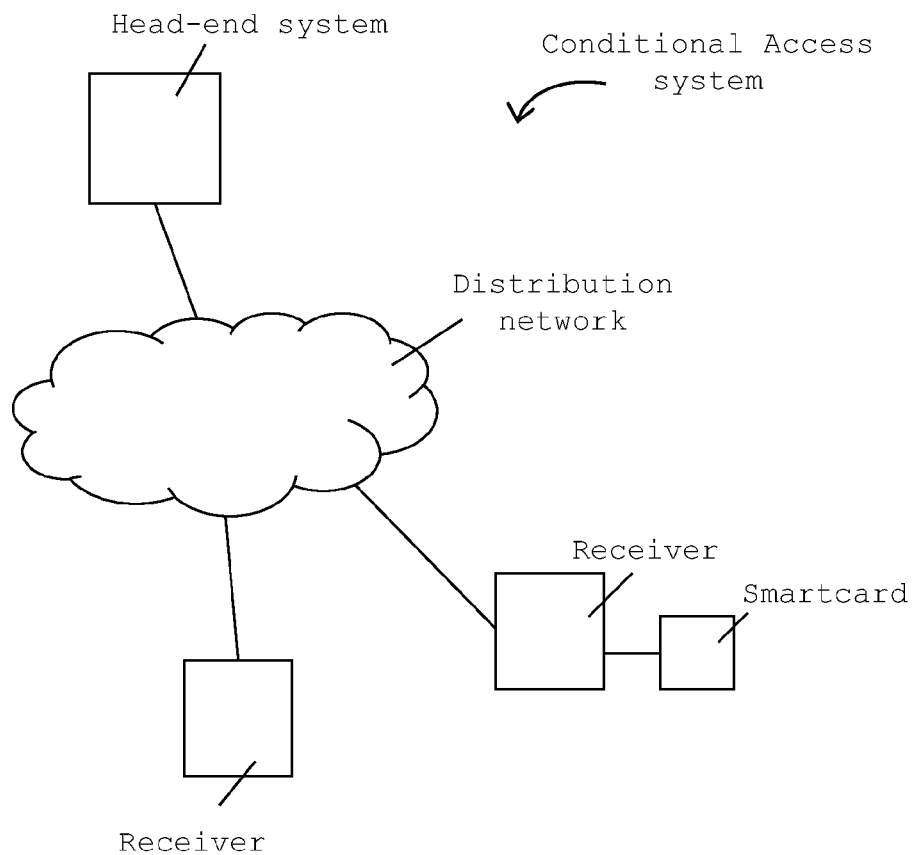
FIG. 13 shows a conditional access system of an exemplary embodiment of the invention.

FIG. 13 shows a conditional access system of an exemplary embodiment of the invention. A head-end system transmits ECMs and EMMs to one or more receivers via the distribution network. The ECM typically contains the transformed control word, e.g. $CWD^{TP}$ of FIG. 9, which is to be processed by the entitlement transform tree in the secure computation environment of the receiver. The secure computation environment may be implemented in a smartcard that is communicatively connected to the receiver. The EMM typically contains one or more seeds, e.g. <P,$G_1$> and <$G_1$,$U_1$> of FIG. 9, used in the transformation of the transformed control word. Other data, such as group membership check data, may be transmitted in the EMM as well. Multiple EMMs may be used for the transmission of the data.

Figure 14:
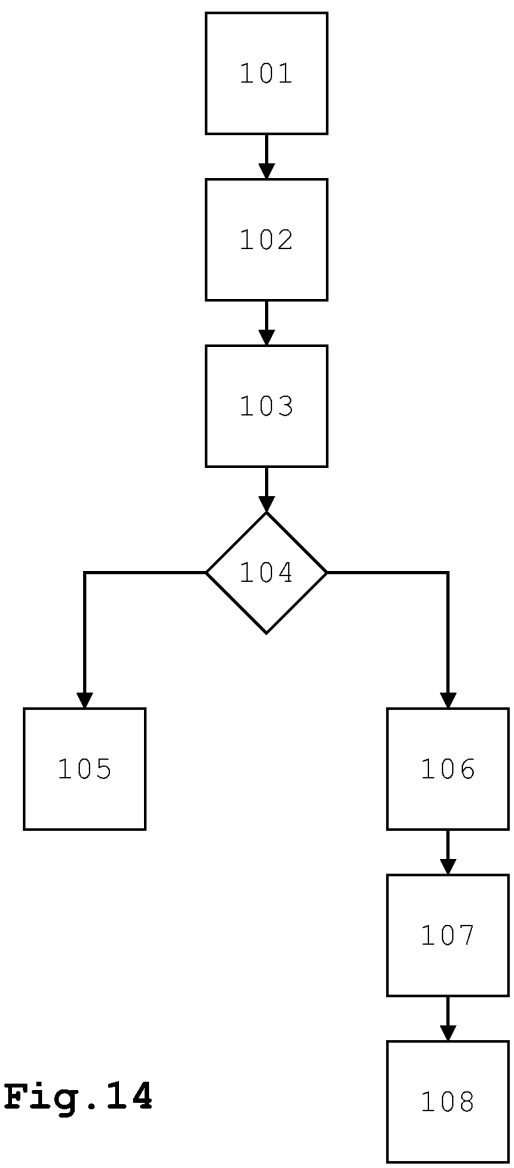
FIG. 14 shows the steps of a method for obtaining a control word in a receiver of an exemplary embodiment of the invention.

In FIG. 14 the steps performed by a receiver of an exemplary embodiment of the invention are schematically shown. In step 101 the transformed control word and the seed are received. In step 102 the transformed control word and the seed are intercepted in the cache control module. In step 103 the control word matching the transform function, the transformed control word and the seed is searched in the cache memory. In step 104 the result of the search is analysed. If the control word was found, it is provided to an output of the transform function in step 105 to thereby bypass the transform function. If the control word was not found, it is provided to the transform function together with the seed in step 106. In step 107 the transformed control word is migrated from an input transform space to an output transform space to obtain the control word using a mathematical transformation under control of the seed. In step 108 the control word is stored in the cache memory associatively with the transform function, the transformed control word and the seed. Step 108 enables a cache hit in step 103 a next time the same transform function is called with the same input values.

Figure 15:
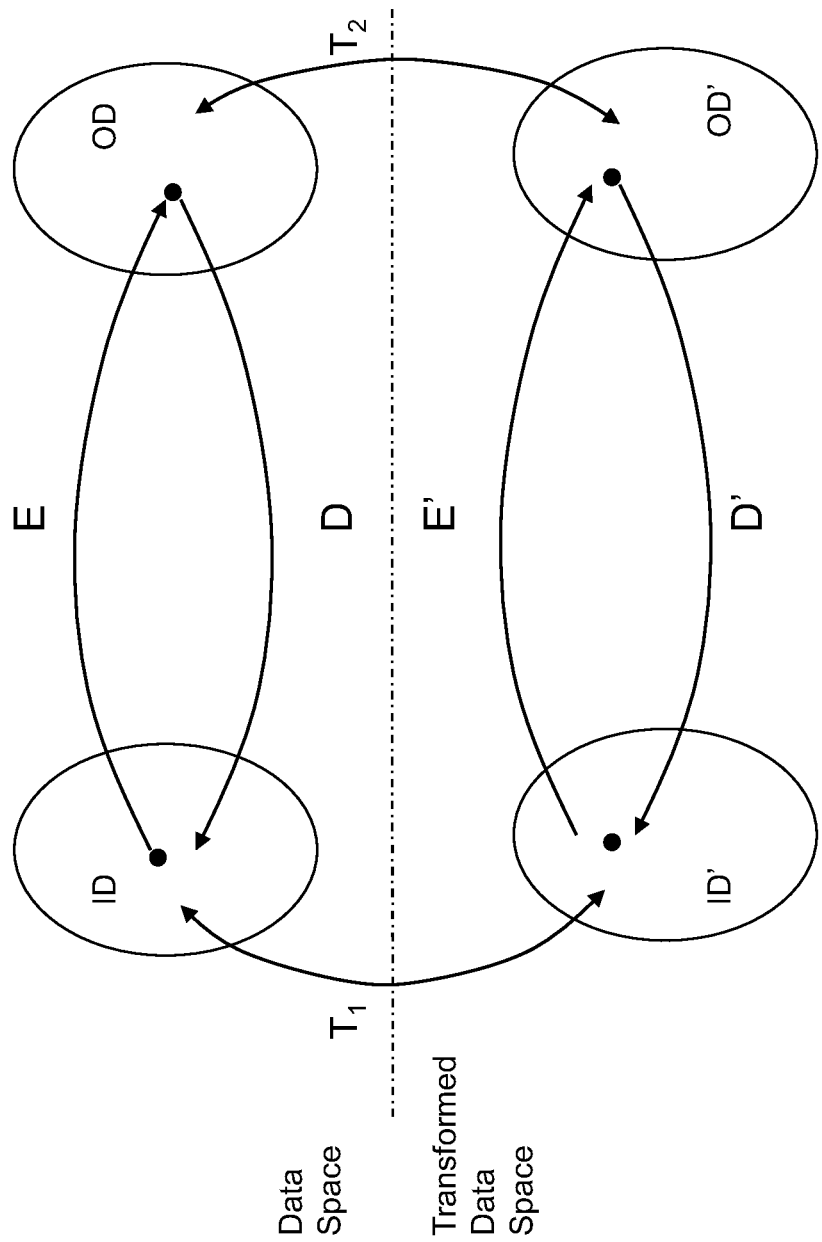
FIG. 15 shows a diagram clarifying transformation functions and encryption in general terms.

As discussed above, data and software obfuscation techniques can make use of transformation functions to obfuscate intermediate results. The concept of transformation functions, as used in this disclosure differs from encryption. The differences are further clarified in general with reference to FIG. 15 and the discussion that follows below.

Assume, there exists an input domain ID with a plurality of data elements in a non-transformed data space. An encryption function E using some key is defined that is configured to accept the data elements of input domain ID as an input to deliver a corresponding encrypted data element in an output domain OD. By applying a decryption function D, the original data elements of input domain ID can be obtained by applying the decryption function D to the data elements of output domain OD. In a non-secure environment (typically referred to as "white-box"), an adversary is assumed to know input and output data elements and have access to internals of encryption function E during execution. Unless extra precautions are taken in this environment, secrets (e.g., the key used in encryption/decryption functions) can be derived easily by an adversary.

Additional security can be obtained in a non-secured environment by applying transformation functions to the input domain ID and output domain OD, i.e. the transformation functions are input- and output operations. Transformation function $T_1$ maps data elements from the input domain ID to transformed data elements of transformed input domain ID' of a transformed data space. Similarly, transformation function $T_2$ maps data elements from the output domain OD to the transformed output domain OD'. Transformed encryption and decryption functions E' and D' can now be defined between ID' and OD' using transformed keys. In case inverse transformations are to be performed, e.g. when results are to be communicated to the non-transformed space, $T_1$ and $T_2$ are bijections.

Using transformation functions $T_1$, $T_2$, together with encryption techniques implies that, instead of inputting data elements of input domain ID to encryption function E to obtain encrypted data elements of output domain OD, transformed data elements of domain ID' are inputted to transformed encryption function E' by applying transformation function $T_1$. Transformed encryption function E' combines the inverse transformation function $T_1^{-1}$ and the transformation function $T_2$ in the encryption operation to protect the confidential information, such as the key. Then transformed encrypted data elements of domain OD' are obtained. Keys for encryption functions E or decryption function D cannot be retrieved when analyzing input data and output data in the transformed data space. This ensures that, even when operating in a non-secure environment, the keys are protected against adversaries. In particular, transformations enables systems to never reveal any part of the key, or any value derived from it, in the clear in contiguous memory. In other words, transformation obfuscates data by applying transformations and operating on the data in the transformed space. In some embodiments, these transformation functions are randomly generated.

An advantage of using transformations to obfuscate data allows the input and output values of these transformations to be stored or cached in the generic (non-secure) computation environment, due to the characteristic that these input and output values are useless to an adversary. In contrast, input and output values of non-transformed encryption functions cannot be stored or cached in the generic computation environment. These values, such as encrypted and decrypted/cleartext key pairs, should not be cached and stored in non-secure memory because they may be useful to an adversary.

One of the transformation functions $T_1$, $T_2$ should be a non-trivial function. In case, $T_1$ is a trivial function, the input domains ID and ID' are the same domain. In case, $T_2$ is a trivial function, the output domains are the same domain.

The function F shown in FIG. 16A is a mathematical operation that migrates data Z across two different transform spaces identified by IN and OUT. The dimension of the output transform space OUT is at least as large as the input transform space IN, and any data Z is represented (possibly not uniquely) in both input and output transform spaces as X and Y respectively. The function F is designed such that it is difficult to run in reverse direction. Because no apparent mapping between the input and output transform spaces exists and the dimension of transform spaces IN and OUT is preferably significantly large, recreation of the function F is prevented. Moreover, the function F is implemented in such a way that it is difficult to extract the data Z as it passes through the function, e.g. using white-box techniques and/or other code obfuscation techniques.

With reference to FIG. 16A, function F is e.g. defined as $Y=F(X)=3*X+2$. If the input transform space IN is a clear text transform space, then $X=(Z)^{IN}=Z$. After migration the following result is obtained: $Y=(Z)^{OUT}=3*X+2$. To migrate Z from the output transform space to the clear text transform space again, a reverse function $F^{-1}(Y)=(Y-2)/3$ must be available to obtain X as follows: $F^{-1}(Y)=(3*X+2-2)/3=X$. In this example Z, X and Y are numbers that can be used to transform using simple addition and subtraction mathematics. It is to be understood that Z, X and Y can be data in any data format, including binary values, numbers, characters, words, and etcetera. The function F can be a more complex function and suitable for operation on e.g. binary values, numbers, characters or words. In some embodiments, the function F is chosen in a manner that is computationally efficient to implement on binary values.

The function F can be defined as a mathematical operation that can be seeded with an additional parameter S, as shown in FIG. 16B. The migration that the function F performs is typically defined by the seed S. This type of seeded transform functions are used in relation to Typically, no information about the input space IN and output space OUT is embedded into F. The function F is chosen such that manipulation of input data X or seed S yields an unpredictable resulting data Y in the output transform space. The seed S does not need to be secured or stored in a secure environment as the seed S is engineered in such a way that no information about transform space IN or OUT can be extracted.

With reference to FIG. 16B, function F is e.g. defined as $F(X,S)=X-7+S$. If the input transform space IN is a clear text transform space, then $X=(Z)^{IN}=Z$. After migration the following result is thus obtained: $Y=(Z)^{OUT}=X-7+S=Z-7+S$. If e.g. a seed S is provided as data comprising the value of 5, then $F(X,5)=X-7+5$ and $Y=(Z)^{OUT}=X-7+5=Z-2$. To migrate Z from the output transform space to the clear text transform space again, a reverse function $F^{-1}(Y,S)=Y+7-S$ must be available to obtain X as follows: $F^{-1}(Y,S)=(X-7+5)+7-S$. If the seed $S=5$ is known, then Z can correctly be obtained as: $F^{-1}(Y,5)=(X-7+5)+7-5=X=Z$.

If the input transform space IN is not a clear text transform space, then function F typically first performs a reverse transformation in the input transform space IN and next a transformation in the output transform space OUT. Such function F is e.g. defined as $F(X,S_1,S_2)=F_2(F_1^{-1}(X,S_1),S_2)$, wherein $F_1^{-1}(X,S_1)=X-2-S_1$ and $F_2(X,S_2)=X-7+S_2$. After migration the following result is thus obtained: $Y=(Z)^{OUT}=(X-2-S_1)-7+S_2=X-9-S_1+S_2$, wherein $X=(Z)^{IN}$.

Seeds $S_1$ and $S_2$ can be provided as two separate seeds to first perform $F_1^{-1}(X,S_1)$ and next perform $F_2(X,S_2)$, or more preferably as a compound of seeds $<S_1,S_2>$. Generally, a compound of seeds is a mixture of multiple seeds. From the mixture of multiple seeds the individual seeds are not derivable. A parameter mixing function for mixing the seeds $S_1$ and $S_2$ is denoted as: $f(S_1,S_2)=<S_1,S_2>$. The function result $<S_1,S_2>$ is called the compound of seeds $S_1$ and $S_2$. In the example above, if $S_1=5$ and $S_2=7$, then one compound is $<S_1,S_2>=5-7=-2$.

In the above examples Z, X, Y and S are numbers that can be used to transform using simple addition and subtraction mathematics. It will be understood that Z, X, Y and S can be data in any data format, including binary values, numbers, characters, words, and etcetera. The function F can be a more complex function and suitable for operation on e.g. binary values, numbers, characters or words. Similar to FIGS. 1A-E, FIG. 17A describes the basic primitives in further detail.

In FIG. 17A the function $A(Data,S)=A_S(Data)=Data^{TS}$ defines an apply primitive that transforms an input Data into a transformed $Data^{TS}$ using an input seed S. In FIG. 17B the function $R(Data^{TS},S)=R_S(Data^{TS})=Data$ defines a remove primitive that reverses the transformation of an input $Data^{TS}$ using a seed S to obtain an output Data. The seed S need to be identical for the two functions A( ) and R( ) to become the inverse of each other.

The original Data and its transformed variant $Data^{TS}$ are typically of a same size, i.e. represented by a same number of bits, making it impossible to determine, based on its size, whether or not the Data is in a particular transformed space.

In FIG. 17C the function $C(Data_1,Data_2)=C_{Data_1}(Data_2)=Data^C$ defines a conditional transformation wherein the output $Data^C$ is a correlation of the two inputs $Data_1$ and $Data_2$. The condition primitive typically preserves the size of the input data and output data, making it impossible to determine whether or not the Data is the result of a correlation.

Primitives such as the apply primitive, remove primitive and the condition primitive can be combined. The combination produces a new operation wherein the individual primitives are invisible.

FIG. 17D shows an example of a combination of a remove and an apply primitive. The transformation operation uses a compound $<P,S>$ as input to the combined remove and apply operation applied to input $Data^{TP}$. The $R_P A_S$ function maps the input $Data^{TP}$ from input transform domain P to output transform domain S to obtain output $Data^{TS}$. All inputs and outputs of the combined remove and apply operation are either transformed or in the form of a compound. The operation is applied to transformed data and produces transformed data. Thus the transformation operation takes place in transformed domain spaces and reveals no individual parameters or untransformed data on any of the interfaces. The function used to produce the compound <P,S> is preferably unique and linked to the implementation of the combined apply and remove operation.

FIG. 17E shows an example of a secured correlation operation on two input compounds <P,S,$Q_1$> and <$Data^{TP}$,$Q_2$>. The $R_P C_Q A_S$ function combines a remove, condition and apply primitive to thereby create output $Data^{CTS}$.

Figure 18:
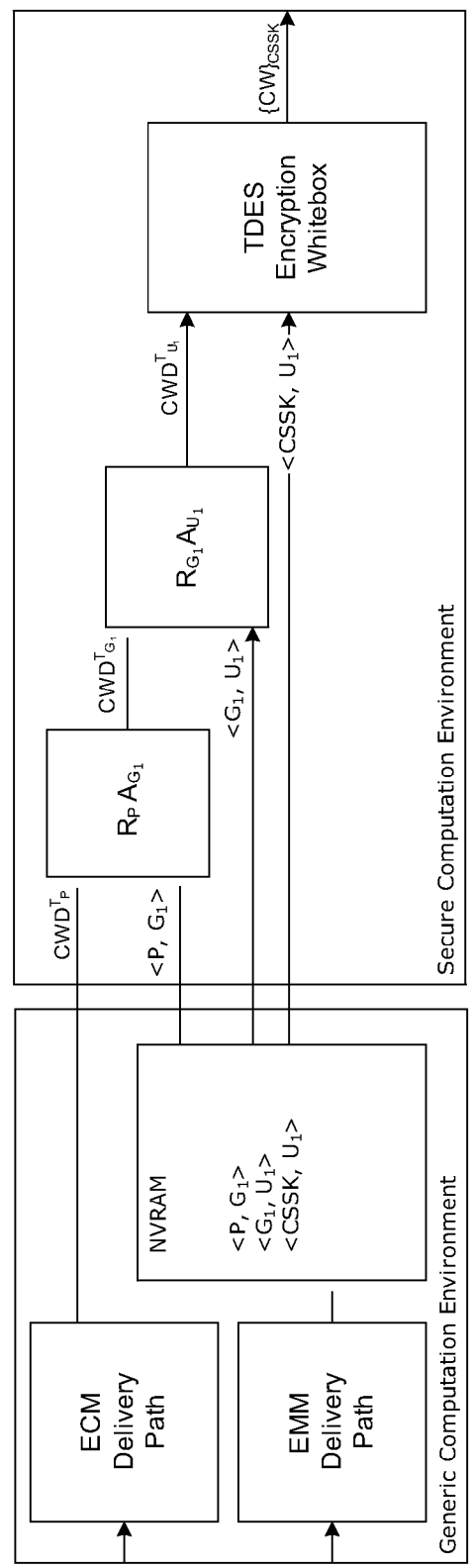
FIG. 18 shows an illustrative example of a receiver applying transformation operations to obtain a control word.

FIG. 18 shows an illustrative example of a transformation path implemented in a receiver of a conditional access receiver. The receiver is typically implemented at least partly as software or as a field-programmable gate array (FPGA) program in a programmable array. The receiver comprises an unprotected, partially protected and/or secure memory of a processor. The processor is configured to execute functions stored in the memory to migrate a secret data Z from an input transform space IN to an output transform space OUT. The secret data Z cannot be extracted or intercepted and thus cannot e.g. be illegally distributed to other receivers.

The receiver receives a control word CW as a globally transformed control word $CWD^T_P$ in an entitlement control message ECM. The receiver migrates the CWD from the input transform space P into the final output transform space CSSK of the receiver in three steps. The last migration step creates a transformed control word $\{CW\}_{CSSK}$, which is the control word CW in the output transform space of the cluster shared secret key (CSSK) that is unique to the receiver.

The receiver comprises a generic computation environment and a secure computation environment.

The generic computation environment comprises an ECM Delivery Path for receiving the ECM from the head-end system. The generic computation environment further comprises an EMM Delivery Path for receiving an Entitlement Management Messages (EMM) from the head-end system. The EMM comprises the seeds that are used to migrate $CWD^T_P$ through the various transform spaces along the path of the transformation path. The seeds received in the EMM are stored in a NVRAM memory of the generic computation environment. A first seed equals the compound <P,$G_1$>. A second seed equals the compound <$G_1$,$U_1$>. A third seed equals the compound <CSSK,$U_1$>.

The secure computation environment comprises a sequence of transformation functions. A first function $R_p A_{G1}$ transforms $CWD^T_P$ from the input transform space P to the output transform space $G_1$ using the compound <P,$G_1$> as seed input. Subsequently a second function $R_{G1} A_{U1}$ transforms $CWD^T_{G1}$, i.e. the CW in the transform space $G_1$, from the input transform space $G_1$ to the output transform space $U_1$ using the compound <$G_1$,$U_1$>. Subsequently a third function, in this example a TDES Whitebox Encryption function, transforms $CWD^T_{U1}$, i.e. the CW in the transform space $U_1$, from the input transform space $U_1$ to the output transform space CSSK. The resulting $\{CW\}_{CSSK}$ is the CW encrypted under the CSSK key, which can be decrypted by the conditional access receiver using the CSSK that is pre-stored in a secured memory of the receiver or securely derivable by the receiver.

It is to be understood that the transformation path in the receiver is not limited to the example shown in FIG. 18 and may contain any number and any kind of transformation operations.

One embodiment of the disclosure may be implemented as a program product for use with a computer system. The program(s) of the program product define functions of the embodiments (including the methods described herein) and can be included on a variety of computer-readable non-transitory storage media. The computer-readable storage media can be a non-transitory storage medium. Illustrative computer-readable and/or non-transitory storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Moreover, the disclosure is not limited to the embodiments described above, which may be varied within the scope of the accompanying claims without departing from the scope of the disclosure.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A receiver for securely obtaining a control word, the receiver comprising:
    a first memory configured for storing a transform function configured to receive a transformed control word and a seed and to migrate the transformed control word from an input transform space to an output transform space to obtain the control word using a mathematical transformation under control of the seed, wherein the control word is in a clear text form or in an encrypted form;
    a cache memory; and
    a cache control module configured to:
        intercept the transformed control word and the seed;
        search in the cache memory for the control word matching the transform function, the transformed control word and the seed;
        in response to the control word matching the transform function and the transformed control word and the seed is found in the cache memory, provide the control word in the cache memory to an output of the transform function without invoking the transform function; and
        in response to the control word matching the transform function and the transformed control word and the seed is not found in the cache memory, activate the transform function to transform the transformed control word into the control word, provide the transformed control word and the seed to an input of the transform function, obtain the control word from the transform function based on the transformed control word and the seed, and store the control word associatively with the transform function, the transformed control word and the seed in the cache memory.

2. The receiver according to claim 1, wherein the first memory is configured for storing two or more transform functions forming a sequence of transform functions and/or a tree of transform functions, and wherein the cache control module is linked to a data bus communicatively connecting the cache memory with one or more of the transform functions.

3. The receiver according to claim 1, comprising a secure computation environment comprising the first memory, the receiver further comprising a generic computation environment comprising the cache memory.

4. The receiver according to claim 3, wherein the generic computation environment comprises the cache control module and wherein the data bus communicatively connects the cache control module to inputs and the output of the one or more of the transform functions.

5. The receiver according to claim 3, wherein each of the one or more of the transform functions comprises a cache control module and wherein the data bus communicatively connects each cache control module to the cache memory.

6. The receiver according to claim 3, further comprising a smartcard, the smartcard possibly being detachably connected to the receiver, and wherein the smartcard comprises the secure computation environment.

7. The receiver according to claim 6, wherein the receiver is communicatively linked to the smartcard via a network.

8. The receiver according to claim 1, wherein the transformed control word is an intermediate value in an entitlement transform tree.

9. A method executed on a processor, for securely obtaining a control word in a receiver comprising a first memory configured for storing a transform function, the method comprising:
receiving a transformed control word and a seed;
intercepting in a cache control module the transformed control word and the seed; searching in a cache memory for the control word matching the transform function, the transformed control word and the seed;
in response to the control word matching the transform function and the transformed control word and the seed is found in the cache memory, providing the control word to an output of the transform function without invoking the transform function, thereby bypassing the transform function; and
in response to the control word matching the transform function and the transformed control word and the seed is not found in the cache memory, activating the transform function including:
providing the transformed control word and the seed to the transform function,
migrating in the transform function the transformed control word from an input transform space to an output transform space based on the transformed control word and the seed to obtain the control word using a mathematical transformation under control of the seed, and
storing the control word associatively with the transform function, the transformed control word and the seed in the cache memory; and
wherein the control word is in a clear text form or in an encrypted form.

10. The method according to claim 9, wherein the transformed control word is an intermediate value in an entitlement transform tree.

11. A non-transitory computer readable storage medium storing one or more programs, the one or more programs comprising instructions, which when executed by a processor, cause the processor to perform a method comprising:
receiving a transformed control word and a seed;
intercepting in a cache control module the transformed control word and the seed; searching in a cache memory for the control word matching the transform function, the transformed control word and the seed;
in response to the control word matching the transform function and the transformed control word and the seed is found in the cache memory, providing the control word to an output of the transform function without invoking the transform function, thereby bypassing the transform function; and
in response to the control word matching the transform function and the transformed control word and the seed is not found in the cache memory, activating the transform function including:
providing the transformed control word and the seed to the transform function,
migrating in the transform function the transformed control word from an input transform space to an output transform space based on the transformed control word and the seed to obtain the control word using a mathematical transformation under control of the seed, and
storing the control word associatively with the transform function, the transformed control word and the seed in the cache memory; and
wherein the control word is in a clear text form or in an encrypted form.

12. The non-transitory computer readable storage medium according to claim 11, wherein the transformed control word is an intermediate value in an entitlement transform tree.

13. A conditional access system comprising: one or more receivers comprising:
a first memory configured for storing a transform function configured to receive a transformed control word and a seed and to migrate the transformed control word from an input transform space to an output transform space to obtain the control word using a mathematical transformation under control of the seed, wherein the control word is in a clear text form or in an encrypted form;
a cache memory; and
a cache control module configured to:
intercept the transformed control word and the seed;
search in the cache memory for the control word matching the transform function, the transformed control word and the seed;
in response to the control word matching the transform function and the transformed control word and the seed is found in the cache memory, provide the control word in the cache memory to an output of the transform function without invoking the transform function; and
in response to the control word matching the transform function and the transformed control word and the seed is not found in the cache memory, activate the transform function to transform the transformed control word into the control word, provide the transformed control word and the seed to an input of the transform function, obtain the control word from the transform function based on the transformed control word and the seed, and store the control word associatively with the transform function, the transformed control word and the seed in the cache memory; and
a head-end system configured to transmit an entitlement control message and an entitlement management message; wherein the entitlement control message comprising the transformed control word, and an entitlement management message comprising the seed; and
wherein the receiver communicates with a head-end system.

14. The conditional access system according to claim 13, wherein the transformed control word is an intermediate value in an entitlement transform tree.

\* \* \* \* \*